(12) United States Patent
Maliverney

(10) Patent No.: US 8,871,889 B2
(45) Date of Patent: *Oct. 28, 2014

(54) COMPOUNDS WITH GUANIDINE STRUCTURE AND USES THEREOF AS ORGANOPOLYSILOXANE POLYCONDENSATION CATALYSTS

(71) Applicant: Bluestar Silicones France, Lyons (FR)

(72) Inventor: Christian Maliverney, Saint Julien sur Bibost (FR)

(73) Assignee: Bluestar Silicones France SAS, Lyons (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/900,046

(22) Filed: May 22, 2013

(65) Prior Publication Data

US 2013/0253134 A1    Sep. 26, 2013

Related U.S. Application Data

(60) filed as application No. PCT/EP2009/065628 on Nov. 23, 2009, now Pat. No. 8,519,079.

(60) Provisional application No. 13/131,146.

(51) Int. Cl.
| | | |
|---|---|---|
| C08L 83/06 | (2006.01) | |
| C08L 83/04 | (2006.01) | |
| C08G 77/08 | (2006.01) | |
| C08K 5/31 | (2006.01) | |

(52) U.S. Cl.
CPC ............... C08G 77/08 (2013.01); C08L 83/04 (2013.01); C08K 5/31 (2013.01)
USPC ............... 528/21; 524/430; 524/588; 528/34

(58) Field of Classification Search
None
See application file for complete search history.

(56) References Cited

U.S. PATENT DOCUMENTS

| | | |
|---|---|---|
| 4,070,328 A | 1/1978 | Homan et al. |
| 5,371,164 A | 12/1994 | Kobayashi et al. |
| 5,696,290 A | 12/1997 | Ruettimann et al. |
| 8,420,761 B2 * | 4/2013 | Barrandon et al. ............. 528/21 |
| 8,455,562 B2 * | 6/2013 | Maliverney ................... 521/129 |
| 2005/0014894 A1 | 1/2005 | Flannigan et al. |
| 2008/0039565 A1 | 2/2008 | Ridley et al. |
| 2009/0182091 A1 | 7/2009 | Noro et al. |

FOREIGN PATENT DOCUMENTS

| | | |
|---|---|---|
| EP | 1939257 A | 7/2008 |
| EP | 1985666 A | 10/2008 |
| JP | 58040365 A | 3/1983 |
| JP | 2005-105235 A | 4/2005 |
| WO | 2007/094272 A1 | 8/2007 |

OTHER PUBLICATIONS

International Search Report dated Jan. 13, 2010 issued in PCT/EP2009/065628.
Machine-generated translation of JP 2005-105235 (Apr. 2005).

* cited by examiner

*Primary Examiner* — Marc Zimmer
(74) *Attorney, Agent, or Firm* — Dentons US LLP

(57) ABSTRACT

A compound having a guanidine structure and uses thereof as organopolysiloxane polycondensation catalysts are described.

14 Claims, No Drawings

COMPOUNDS WITH GUANIDINE STRUCTURE AND USES THEREOF AS ORGANOPOLYSILOXANE POLYCONDENSATION CATALYSTS

CROSS-REFERENCE TO PRIOR APPLICATIONS

This application is a continuation of U.S. application Ser. No. 13/131,146, filed Jul. 29, 2011, now allowed, which is a United States national phase of PCT/EP2009/065628, filed Nov. 23, 2009, and designating the United States (published in the French language on Jun. 3, 2010, as WO2010/060877 A1; the title and abstract were also published in French), which claims foreign priority under 35 U.S.C. §119 of FR 0806610, filed Nov. 25, 2008, each hereby expressly incorporated by reference in its entirety and each assigned to the assignee hereof.

The present invention relates to an organopolysiloxane composition that can be vulcanized at room temperature into an elastomer that is crosslinked by polycondensation and that does not contain alkyltin-based catalysts which exhibit toxicity problems.

The invention also relates to novel polycondensation catalysts with a guanidine structure, in silicone chemistry, and to the uses thereof as catalysts for the organopolysiloxane polycondensation reaction.

Formulations of elastomers that crosslink via polycondensation generally involve a silicone oil, generally a polydimethylsiloxane, with hydroxyl end groups, optionally prefunctionalized with a silane so as to have alkoxy ends, a crosslinking agent, a polycondensation catalyst, conventionally a tin salt or an alkyl titanate, a reinforcing filler and other optional additives such as bulking fillers, adhesion promoters, colorants, biocidal agents, etc.

These room-temperature vulcanizing organopolysiloxane compositions are well known and are classified into two different groups: single-component (RTV-1) compositions and two-component (RTV-2) compositions.

The term "RTV" is the acronym for "Room Temperature Vulcanizing".

During crosslinking, water (either provided by atmospheric moisture in the case of RTV-1 compositions, or introduced into a part of the composition in the case of RTV-2 compositions) enables the polycondensation reaction, which results in the formation of the elastomeric network.

Generally, single-component (RTV-1) compositions crosslink when they are exposed to moisture from the air, i.e. they cannot crosslink in an enclosed medium. For example, the single-component silicone compositions used as sealants or adhesives cold-crosslink according to a mechanism of hydrolysis of reactive functions of the acetoxysilane, ketiminoxysilane, alkoxysilane, etc., type, followed by condensation reactions between silanol groups formed and other residual reactive functions. The hydrolysis is generally carried out by virtue of water vapor which diffuses into the material from the surface exposed to the atmosphere. Generally, the kinetics of the polycondensation reactions is extremely slow; these reactions are therefore catalyzed by a suitable catalyst. As catalysts which are employed, use is most often made of catalysts based on tin, titanium or an amine or compositions of these catalysts. Catalysts based on tin (cf. in particular FR-A-2 557 582) and on titanium (cf. in particular FR-A-2 786 497) are catalysts that are very effective. Single-component silicone elastomers with —Si(OR) ends are sometimes referred to as alkoxy elastomers.

As regards two-component compositions, they are sold and stored in the form of two-components, a first component containing the base polymer materials and the second component containing the catalyst. The two components are mixed at the time of use and the mixture crosslinks in the form of a relatively hard elastomer. These two-component compositions are well known and are described, in particular, in the book by Walter Noll "Chemistry and Technology of Silicones" 1968, $2^{nd}$ edition, on pages 395 to 398. These compositions essentially comprise four different ingredients:
an α,ω-dihydroxydiorganopolysiloxane reactive polymer,
a crosslinking agent, generally a silicate or a polysilicate,
a tin catalyst, and
water.

Usually, the condensation catalyst is based on an organic tin compound. Indeed, many tin-based catalysts have already been proposed as crosslinking catalysts for these RTV-1 or RTV-2 compositions. Conventional polycondensation catalysts comprise dialkyltin compounds, in particular dialkyltin dicarboxylates such as dibutyltin dilaurate and dibutyltin diacetate, alkyl titanate compounds such as tetrabutyltitanate or tetra-isopropyltitanate, and titanium chelates (EP-A-0 885 933, U.S. Pat. Nos. 5,519,104, 4,515,932, 4,563,498, 4,528, 353).

However, the alkyltin-based catalysts, although very effective, usually colorless, liquid and soluble in silicone oils, have the drawback of being toxic (CMR2 toxic for reproduction).

Thus, international application WO 2004/020525 describes single-component (RTV-1) silicone compositions used as sealants or adhesives and which cold-crosslink when they are exposed to the moisture in the air and which comprise, in addition to the usual components:
a specific and essential crosslinking agent (D) which is a silane comprising 1-methylvinyloxy functions, known for its strong reactivity compared with that of the conventional crosslinking agents, and
catalysts which are organic derivatives comprising imine functions, of formula (I) or (II) below:

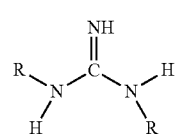

(I)

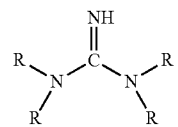

(II)

with R being a specific radical chosen from the following groups: methyl, isopropyl, phenyl and ortho-tolyl. Examples of these organic derivatives of imine type are 1,3-diphenylguanidine, 1,3-di-o-tolylguanidine, 1,3-dimethylguanidine and 1,1,3,3-tetra-methylguanidine, which is the preferred derivative. These derivatives have the particularity of possessing an unsubstituted imine function, i.e. a function of the C=NH type.

It should be noted that a conventional crosslinking agent of trialkoxysilane type, component (E), is still used in combination with the crosslinking agent (D) which is a silane known for its strong reactivity due to the presence of functions of 1-methylvinyloxy type.

However, the problem associated with the use of the organic catalysts comprising imine functions described in international application WO 2004/020525 is that they must be used in the presence of specific crosslinking agents that are very reactive and expensive (silanes comprising 1-methylvinyloxy functions), that is to say that conventional crosslinking agents having simple structures, which are very widely used in RTV-1 or RTV-2 formulations, for instance alkyltrialkoxysilanes, alkyl silicates or poly(alkyl silicate)s, cannot be combined with them without the obligatory presence of a very reactive crosslinking agent such as the silane with 1-methylvinyloxy functions. This is because, without the presence of this very reactive silane, the crosslinking of the composition into an elastomer is then insufficient and does not make it possible to obtain good mechanical properties. Thus, the 1,1,3,3-tetramethylguanidine derivative, which is presented in the preferred embodiment of this patent application, when it is used with a conventional crosslinking agent, for instance a poly(alkyl silicate), and without the presence of a reactive silane comprising methylvinyloxy functions, in a single-component RTV (RTV-1), the crosslinking of the system is then insufficient and cannot generate a silicone elastomer.

These problems with reactivity of the crosslinking agent, for example, in single-component (RTV-1) silicone compositions are well known by those skilled in the art. Indeed, the alkoxysilane crosslinking agents most widely used are those which have methoxy groups for their intrinsic reactivities. However, one of the problems associated with the use of alkoxysilanes of this type is that methanol is given off and is a source of problems in terms of health and safety.

For a sustainable development, it therefore appears to be necessary to develop other, nontoxic, catalysts for the organopolysiloxane polycondensation reaction which can be used in the crosslinking of both single-component elastomer compositions and two-component elastomer compositions. In addition, these catalysts should be usable irrespective of the type of crosslinking agent used.

Another important aspect for an organopolysiloxane polycondensation reaction catalyst is the working time (pot-life), i.e. the time during which the composition can be used after mixing, without it curing. This time should be sufficiently long to allow its use, but sufficiently short to obtain a handleable molded object at the latest a few minutes or a few hours after it has been produced. The catalyst should therefore make it possible to obtain a good compromise between the time during which the catalyzed mixture can be used and the time after which the molded object is handleable (these times depend on the intended application, for instance the molding or the production of seals). In addition, the catalyst should confer, on the catalyzed mixture, a spreading time which does not vary according to the storage time.

It also appears to be necessary to provide a two-component (RTV-2) organopolysiloxane composition which has, at the same time, the following properties:
1) a rapid setting speed at ambient temperature (surface and enclosed) while at the same time maintaining a pot-life that is sufficiently long (of the order of a few minutes) to allow its use,
2) good mechanical properties after crosslinking, and
3) good extrudability.

Thus, one of the essential objectives of the present invention is to propose a catalyst which is nontoxic but which continues to satisfy at the same time the constraints of storage, of use and of crosslinking of the two types of single-component and two-component elastomer compositions while at the same time being usable irrespective of the type of crosslinking agent used.

Another essential objective of the present invention is therefore to propose a novel nontoxic catalyst which allows, with the moisture in the air, both surface crosslinking but also core crosslinking which is as complete as possible.

Another essential objective of the present invention is to provide a single-component (RTV-1) and two-component (RTV-2) organopolysiloxane composition comprising a catalyst according to the invention and satisfying the criteria stated above.

These objectives, among others, are achieved by the present invention which relates, first of all, to an organopolysiloxane composition which does not contain any metal catalyst and which is characterized in that it comprises, firstly, a silicone base B comprising at least one polyorganosiloxane oil or gum C which can be crosslinked via a polycondensation reaction so as to form a silicone elastomer and, secondly, a catalytically effective amount of at least one polycondensation catalyst A which is a nonsilylated organic compound corresponding to general formula (I):

(I)

in which:
the $R^1$, $R^2$, $R^3$, $R^4$ or $R^5$ radicals, which may be identical or different, represent, independently of one another, a linear or branched monovalent alkyl group, a cycloalkyl group, a (cycloalkyl)alkyl group, the ring being substituted or unsubstituted and being able to comprise at least one heteroatom, or a fluoroalkyl group, an aromatic group, an arylalkyl group, a fluoroalkyl group, an alkylamine group or an alkylguanidine group,
the $R^1$, $R^2$, $R^3$ or $R^4$ radicals may be linked in pairs so as to form a 3-, 4-, 5-, 6- or 7-membered aliphatic ring optionally substituted with one or more substituents, and
with the additional proviso that the $R^1$, $R^2$, $R^3$, $R^4$ and $R^5$ radicals do not comprise a silicon atom.

To achieve this objective, the applicant has, to its credit, demonstrated, entirely surprisingly and unexpectedly, that the nonsilylated compounds corresponding to general formula (I) make it possible to catalyze the organopolysiloxane polycondensation reaction and can be used in the crosslinking of both single-component and two-component elastomer compositions, irrespective of the type of crosslinking agent used.

It is also to the inventors' credit to have overcome the technical prejudice, as taught, for example, by international application WO 2004/020525, which claimed that, up until then, structurally close catalysts, such as 1,3-diphenylguanidine, 1,3-di-o-tolylguanidine, 1,3-dimethylguanidine or 1,1,3,3-tetramethylguanidine, had to be combined with very reactive and expensive specific crosslinking agents (silanes comprising 1-methylvinyloxy functions), in order to crosslink formulations of RTV type.

The nonsilylated compounds according to the invention corresponding to general formula (I) are pentasubstituted guanidines and have the advantage of being liquid, colorless, odorless and soluble in silicone matrices. The nonsilylated guanidines according to the invention are used in the silicone systems to be crosslinked at very low contents, and make it possible, according to the content, to adjust the pot-life to the application while at the same time guaranteeing that the elastomers obtained have excellent hardness, and also an excellent thermal stability, thus eliminating the problems associated with the reversion phenomena.

It is important to note that:

1) the definition of the $R^1$ groups excludes, inter alia, the hydrogen atom, which consequently implies that general formula (I) according to the invention does not encompass molecules having a C=NH function, such as, for example, molecules of general formula (III):

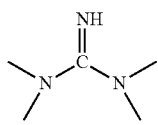
(III)

an example of a molecule of general formula (III) not included in the definition of the invention is, for example, 1,1,3,3-tetramethylguanidine (molecule having a C=NH function), and 2) the definition of the "polyorganosiloxane oil C which can be crosslinked via a polycondensation reaction" does not encompass organic polymers that can have silylated groups. Thus, the expression "polyorganosiloxane oil or gum" is intended to mean polymers having a sequence of siloxyl units (≡Si—O—Si≡).

According to one preferred embodiment, the polycondensation catalyst A is a nonsilylated organic compound corresponding to general formula (I) and in which:

the $R^1$ radicals, which may be identical or different, and the $R^3$ radical, are chosen, independently of one another, from the group consisting of: an isopropyl radical, a cyclohexyl radical and a linear or branched, monovalent $C_1$-$C_{12}$ alkyl radical, the $R^2$ radical represents a linear or branched monovalent alkyl group, a cycloalkyl group, an alkyl group substituted with a ring, which is substituted or unsubstituted and which can comprise at least one heteroatom, an arylalkyl group, a fluoroalkyl group, an alkylamine group or an alkylguanidine group, and the $R^1$, $R^2$, $R^3$ or $R^4$ radicals can be linked in pairs so as to form a 3-, 4-, 5-, 6- or 7-membered aliphatic ring optionally substituted with one or more substituents.

Polycondensation catalysts A which are particularly preferred are nonsilylated organic compounds chosen from the group consisting of the following compounds (A1) to (A3):

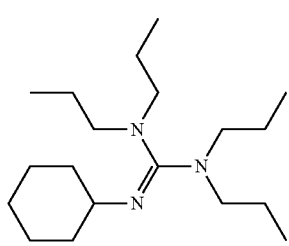
(A1)

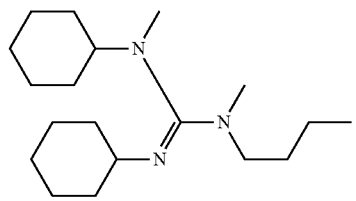
(A2)

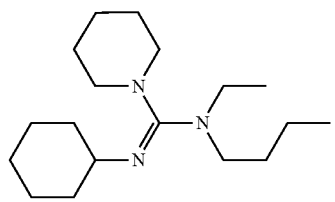
(A3)

The amount of polycondensation catalysts A according to the invention is between 0.1 and 10% by weight of the total mass, preferably between 0.1% and 5%, whether it is a single-component or two-component preparation.

According to another preferred embodiment, the composition according to the invention as described above is characterized in that it also comprises a catalytically effective amount of at least one polycondensation catalyst A as defined according to any one of claims 1 to 3 and a silicone base B comprising:

at least one polyorganosiloxane oil C capable of crosslinking by polycondensation to give an elastomer;
optionally, at least one crosslinking agent D;
optionally, at least one adhesion promoter E; and
optionally, at least one siliceous, organic and/or nonsiliceous mineral filler F.

For the implementation of the invention, the silicone base B can comprise:

for 100 parts by weight of at least one polyorganosiloxane oil C capable of crosslinking by polycondensation, which is an α,ω-dihydroxydiorganopolysiloxane reactive polymer of which the organic radicals are hydrocarbon-based radicals, preferably chosen from the group consisting of: alkyls containing from 1 to 20 carbon atoms; cycloalkyls containing from 3 to 8 carbon atoms; alkenyls containing from 2 to 8 carbon atoms and cycloalkenyls containing from 5 to 8 carbon atoms, from 0.1 to 60 parts by weight of at least one crosslinking agent D chosen from the group consisting of: polyalkoxysilanes, products originating from the partial hydrolysis of a polyalkoxysilane, and polyalkoxysilanes, from 0 to 60 parts by weight of an adhesion promoter E as described above, from 0 to 250 parts by weight, preferably from 5 to 200 parts by weight, of at least one siliceous, organic and/or nonsiliceous mineral filler F, from 0.001 to 10 parts by weight of water, from 0 to 100 parts by weight of at least one non-reactive, linear polyorganosiloxane polymer G consisting of a linear homopolymer or copolymer of which, per molecule, the monovalent organic substituents, which may be identical to or different than one another, and which are bonded to the silicon atoms, are chosen from alkyl, cycloalkyl, alkenyl, aryl, alkylarylene and arylalkylene radicals, from 0 to 20 parts by weight of a coloring base or of a coloring agent H, from 0 to 70 parts by weight of polyorganosiloxane resins I, and from 0 to 20 parts of auxiliary additives J known to those skilled in the art, such as plasticizers, crosslinking retardants, mineral oils, antimicrobial agents or heat stabilizers, such as titanium oxides, iron oxides or cerium oxides.

From 0.1 to 50 parts by weight of at least one polycondensation catalyst A according to the invention and as described above are added to said silicone base B.

The invention also relates to a two-component system which is a precursor of the organopolysiloxane composition according to the invention and as described above, said composition being vulcanizable to give a silicone elastomer via polycondensation reactions and being characterized in that it is in two separate parts P1 and P2 intended to be mixed so as to form said composition, and in that one of these parts comprises the polycondensation catalyst A according to the invention and as defined above as catalyst of the reaction for polycondensation of organopolysiloxanes and the crosslinking agent D, whereas the other part is free of the abovementioned entities and comprises:

for 100 parts by weight of the polyorganosiloxane oil(s) C capable of crosslinking by polycondensation to give an elastomer, and from 0.001 to 10 part(s) by weight of water.

Another subject of the invention consists of a single-component polyorganosiloxane composition which is stable during storage in the absence of moisture and which crosslinks, in the presence of water, to give an elastomer, characterized in that it comprises:

at least one crosslinkable linear polyorganosiloxane oil C which has functionalized ends of alkoxy, oxime, acyl and/or enoxy type, preferably alkoxy type, at least one crosslinking agent D, at least one filler F, and at least one catalyst of the polycondensation reaction which is the polycondensation catalyst A according to the invention and as defined above.

According to one preferred embodiment, the single-component polyorganosiloxane composition defined above is characterized in that the crosslinkable linear polyorganosiloxane oil C having functionalized ends of alkoxy type is prepared in situ by reacting, in the presence of a catalytically effective amount of lithium hydroxide, a linear diorganopolysiloxane, comprising a hydroxyl group bonded to a silicon atom at each chain end, with at least one polyalkoxysilane of formula (II) below:

$$(R^4)_c(R^5)_a Si(OR^6)_{4-(a+c)} \quad (II)$$

in which:

a is equal to 0, 1 or 2, c is equal to 0, 1 or 2, the sum a+c is equal to 0, 1 or 2, $R^4$ represents an aliphatic, cyclanic or aromatic, substituted or unsubstituted, and saturated or unsaturated $C_1$ to $C_{13}$ hydrocarbon-based monovalent radical, it being possible for $R^4$ to be identical to $R^5$, $R^5$ represents an aliphatic, cyclanic or aromatic, substituted or unsubstituted, and saturated or unsaturated $C_1$ to $C_{13}$ hydrocarbon-based monovalent radical which can comprise an epoxy, primary, secondary or tertiary amine, or mercapto function, and $R^6$ represents an aliphatic organic radical containing from 1 to 8 carbon atoms, chosen in particular from alkyl radicals, alkyl ether radicals, alkyl ester radicals, alkyl ketone radicals, alkylcyano radicals and aralkyl radicals containing from 7 to 13 carbon atoms, it being understood that the alkoxy groups of the silane of formula (II) can each have a different meaning for $R^6$ or the same meaning.

According to one preferred embodiment, it is advantageous for the crosslinking agent D or the polyalkoxysilane of formula (II) to be chosen from the group consisting of:

vinyltriethoxysilane, methyltriethoxysilane, propyltriethoxysilane, 1,2-bis(triethoxysilyl)ethane, $C_2H_5Si(OC_2H_5)_3$, and $Si(OC_2H_5)_4$.

This is because, with this type of crosslinking agent, there is no longer any release of methanol, as with the conventional trimethoxysilane crosslinking agent, thus solving many health and safety problems.

According to another of the aspects of the present invention, the subject matter thereof is also an elastomer obtained by crosslinking and curing of the two-component system according to the invention as defined above, of the single-component polyorgano-siloxane composition according to the invention as defined above or of the composition according to the invention as defined above.

Another subject of the invention consists of novel compounds of formulae (A-2) and (A-3):

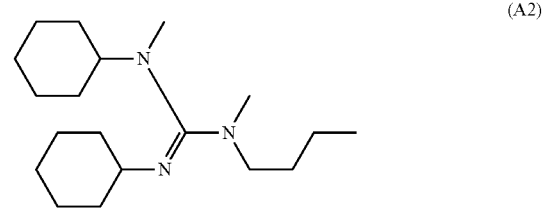

(A2)

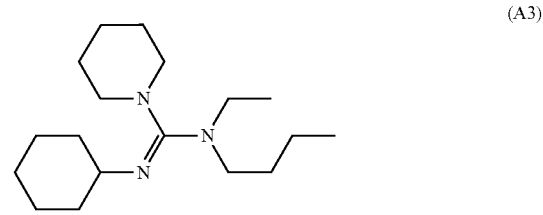

(A3)

Another subject of the invention consists of the use, for catalyzing the organopolysiloxane polycondensation reaction, of a polycondensation catalyst A which is a nonsilylated organic compound corresponding to general formula (I):

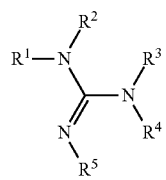

(I)

in which:

the $R^1$, $R^2$, $R^3$, $R^4$ or $R^5$ radicals, which may be identical or different, represent, independently of one another, a linear or branched monovalent alkyl group, a cycloalkyl group, a (cycloalkyl)alkyl group, the ring being substituted or unsubstituted and being able to comprise at least one heteroatom or a fluoroalkyl group, an aromatic group, an arylalkyl group, a fluoroalkyl group, an alkylamine group or an alkylguanidine group, the $R^1$, $R^2$, $R^3$ or $R^4$ radicals can be linked in pairs so as to form a 3-, 4-, 5-, 6- or 7-membered aliphatic ring optionally substituted with one or more substituents, and with the additional proviso that the $R^1$, $R^2$, $R^3$, $R^4$ and $R^5$ radicals do not comprise a silicon atom.

According to one preferred embodiment, the use according to the invention for catalyzing the organopolysiloxane polycondensation reaction is carried out using a polycondensation catalyst A which is a nonsilylated organic compound chosen from the group consisting of the following compounds (A1) to (A3):

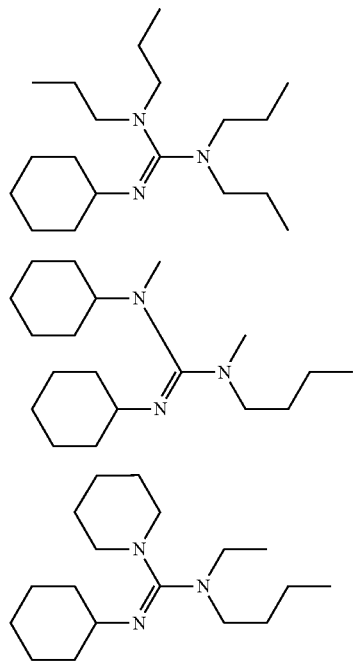

The catalysts in accordance with the present invention are nontoxic, unlike the alkyltin-based catalysts. Furthermore, they make it possible to achieve, both under single-component and two-component conditions, silicone polycondensation rates that are as high or even better than those obtained with these alkyltin-based catalysts.

Description of the Silicone Base B:

The silicone bases used in the present invention that crosslink and cure via polycondensation reactions are well known. These bases are described in detail in particular in numerous patents and they are commercially available.

These silicone bases may be single-component bases, i.e. bases that are packaged in a single package, and stable during storage in the absence of moisture, which can be cured in the presence of moisture, in particular moisture provided by the ambient air or by water generated within the base during the use thereof.

Apart from single-component bases, use may be made of two-component bases, i.e. bases that are packaged in two packages, which cure as soon as the polycondensation catalyst according to the invention is incorporated. They are packaged, after incorporation of the catalyst, in two separate fractions, one of the fractions possibly containing, for example, only the catalyst according to the invention or a mixture with the crosslinking agent.

The silicone base B used to prepare the composition according to the invention may comprise:
- at least one polyorganosiloxane oil C capable of crosslinking by polycondensation to give an elastomer;
- optionally, at least one crosslinking agent D;
- optionally, at least one adhesion promoter E; and
- optionally, at least one siliceous, organic and/or nonsiliceous mineral filler F.

The polyorganosiloxane oil C is preferably an α,ω-dihydroxypolydiorganosiloxane polymer which has a viscosity of between 50 and 5 000 000 mPa·s at 25° C., and the crosslinking agent D is preferably an organosilicon compound bearing more than two hydrolyzable groups bonded to the silicon atoms per molecule. The polyorganosiloxane oil C may also be functionalized at its ends with hydrolyzable radicals obtained by condensation of a precursor bearing hydroxyl functions with a crosslinking silane bearing hydrolyzable radicals.

As crosslinking agent (D), mention may be made of:
silanes of the following general formula:

$$R^1_k Si(OR^2)_{(4-k)}$$

in which the symbols $R^2$, which may be identical or different, represent alkyl radicals having from 1 to 8 carbon atoms, such as methyl, ethyl, propyl, butyl, pentyl or 2-ethylhexyl radicals, or $C_3$-$C_6$ oxyalkylene radicals, the symbol $R^1$ represents a linear or branched, saturated or unsaturated, aliphatic hydrocarbon-based group or a saturated or unsaturated and/or aromatic, monocyclic or polycyclic carbocyclic group, and k is equal to 0, 1 or 2; and the partial hydrolysis products of this silane.

As examples of $C_3$-$C_6$ alkoxyalkylene radicals, mention may be made of the following radicals:
$CH_3OCH_2CH_2$—
$CH_3OCH_2CH(CH_3)$—
$CH_3OCH(CH_3)CH_2$—
$C_2H_5OCH_2CH_2CH_2$—

The symbol $R^1$ represents a $C_1$-$C_{10}$ hydrocarbon-based radical that encompasses:
$C_1$-$C_{10}$ alkyl radicals such as methyl, ethyl, propyl, butyl, pentyl, 2-ethylhexyl, octyl or decyl radicals,
vinyl and allyl radicals, and
$C_5$-$C_8$ cycloalkyl radicals such as phenyl, tolyl and xylyl radicals.

The crosslinking agents D are products that are available on the silicones market; furthermore, their use in room-temperature curing compositions is known; it occurs in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents D, preference is more particularly given to alkyltrialkoxysilanes, alkyl silicates and alkyl polysilicates, in which the organic radicals are alkyl radicals having from 1 to 4 carbon atoms.

As other examples of crosslinking agents D that may be used, mention is more particularly made of the following silanes:
propyltrimethoxysilane,
methyltrimethoxysilane,
ethyltrimethoxysilane,
vinyltriethoxysilane,
methyltriethoxysilane,
propyltriethoxysilane,
tetraethoxysilane,
tetrapropoxysilane,
1,2-bis(trimethoxysilyl)ethane,
1,2-bis(triethoxysilyl)ethane, and tetraisopropoxysilane,
or else: $CH_3Si(OCH_3)_3$; $C_2H_5Si(OC_2H_5)_3$; $C_2H_5Si(OCH_3)_3$; $CH_2=CHSi(OCH_3)_3$; $CH_2=CHSi(OCH_2CH_2OCH_3)_3$; $C_6H_5Si(OCH_3)_3$; $[CH_3][OCH(CH_3)CH_2OCH_3]Si[OCH_3]_2$; $Si(OCH_3)_4$; $Si(OC_2H_5)_4$; $Si(OCH_2CH_2CH_3)_4$; $Si(OCH_2CH_2CH_2CH_3)_4$; $Si(OC_2H_4OCH_3)_4$; $CH_3Si(OC_2H_4OCH_3)_3$; $ClCH_2Si(OC_2H_5)_3$.

As other examples of crosslinking agent D, mention may be made of ethyl polysilicate or n-propyl polysilicate.

Use is generally made of 0.1 to 60 parts by weight of crosslinking agent D per 100 parts by weight of polyorganosiloxane C capable of crosslinking by polycondensation to give an elastomer.

Thus, the composition according to the invention may comprise at least one adhesion promoter E such as, for example, the organosilicon compounds bearing both:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and even more preferably from the group constituted of the following compounds taken alone or as a mixture:
vinyltrimethoxysilane (VTMO);
3-glycidoxypropyltrimethoxysilane (GLYMO),
methacryloxypropyltrimethoxysilane (MEMO),
$[H_2N(CH_2)_3]Si(OCH_2CH_2CH_3)_3$
$[H2N(CH_2)_3]Si(OCH_3)_3$
$[H2N(CH_2)_3]Si(OC_2H_5)_3$
$[H2N(CH_2)_4]Si(OCH_3)_3$
$[H2NCH_2CH(CH_3)CH_2CH_2]SiCH_3(OCH_3)_2$
$[H_2NCH_2]Si(OCH_3)_3$
$[n\text{-}C_4H_9-HN-CH_2]Si(OCH_3)_3$
$[H_2N(CH_2)_2NH(CH_2)_3]Si(OCH_3)_3$
$[H_2N(CH_2)_2NH(CH_2)_3]Si(OCH2CH_2OCH_3)_3$
$[CH_3NH(CH_2)_2NH(CH_2)_3]Si(OCH_3)_3$
$[H(NHCH_2CH_2)_2NH(CH_2)_3]Si(OCH_3)_3$

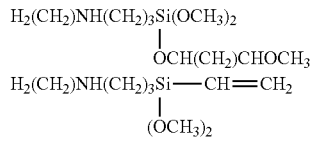

or polyorganosiloxane oligomers containing such organic groups at a content of greater than 20%.

For the single-component and two-component bases, use is made, as mineral fillers F, of very finely divided products, the average particle diameter of which is less than 0.1 μm. Among these fillers are fumed silicas and precipitated silicas; their BET specific surface area is generally greater than 40 m$^2$/g. These fillers may also be in the form of more coarsely divided products, having an average particle diameter of greater than 0.1 μm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m$^2$/g.

These fillers may have been surface-modified by treatment with the various organosilicon compounds customarily used for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3% to 30% of their weight of organosilicon compounds. The fillers may be constituted of a mixture of several types of fillers of different particle size; thus, for example, they may be constituted of from 30% to 70% of finely divided silicas with a BET specific surface area of greater than 40 m$^2$/g and of from 70% to 30% of more coarsely divided silicas with a specific surface area of less than 30 m$^2$/g.

The purpose of introducing fillers is to confer good mechanical and rheological characteristics on the elastomers that result from the curing of the compositions in accordance with the invention.

In combination with these fillers, use may be made of inorganic and/or organic pigments and also agents that improve the thermal resistance (salts and oxides of rare-earth elements such as ceric oxides and hydroxides) and/or the fire resistance of the elastomers. For example, it is possible to use the cocktails of oxides described in international application WO 98/29488. Among the agents for improving fire resistance, mention may be made of halogenated organic derivatives, organic phosphorus derivatives, platinum derivatives, such as chloroplatinic acid (its reaction products with alkanols or ether oxides), or platinous chloride-olefin complexes. These pigments and agents together represent at most 20% of the weight of the fillers.

Other customary auxiliary agents and additives may be incorporated into the composition according to the invention; these are chosen according to the applications in which said compositions are used.

The silicone base used to prepare the composition according to the invention may comprise:
100 parts of polyorganosiloxane oil C capable of crosslinking by polycondensation to give an elastomer;
0 to 20 parts of a crosslinking agent D;
0 to 20 parts of an adhesion promoter E; and
0 to 50 parts of filler F.

In addition to the main constituents, nonreactive linear polyorganosiloxane polymers G may be introduced with the intention of acting on the physical characteristics of the compositions in accordance with the invention and/or the mechanical properties of the elastomers resulting from the curing of these compositions.

These nonreactive linear polyorganosiloxane polymers G are well known; they comprise more especially: α,ω-bis(triorganosiloxy)diorganopolysiloxane polymers with viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, at least 60% of these organic radicals being methyl radicals and at most 10% being vinyl radicals. The viscosity of these polymers can reach several tens of millions of mPa·s at 25° C.; they therefore include oils with a fluid to viscous appearance and soft to hard gums. They are prepared according to the usual techniques described more specifically in French patents FR-A-978 058, FR-A-1 025 150, FR-A-1 108 764 and FR-A-1 370 884. Use is preferably made of α,ω-bis(trimethylsiloxy)dimethylpolysiloxane oils with a viscosity ranging from 10 mPa·s to 1000 mPa·s at 25° C. These polymers, which act as plasticizers, can be introduced in a proportion of at most 70 parts, preferably from 5 to 20 parts, per 100 parts of polyorganosiloxane oil C capable of crosslinking by polycondensation.

The compositions according to the invention can also advantageously comprise at least one silicone resin H. These silicone resins are branched organopolysiloxane polymers which are well known and which are commercially available. They have, per molecule, at least two different units chosen from those of formula $R'''_3SiO_{1/2}$ (M unit), $R'''_2SiO_{2/2}$ (D unit), $R'''SiO_{3/2}$ (T unit) and $SiO_{4/2}$ (Q unit). The $R'''$ radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as alkyl R radicals, of methyl, ethyl, isopropyl, tert-butyl and n-hexyl radicals. These resins are preferably hydroxylated and have, in this case, a weight content of hydroxyl groups of between 5 and 500 meq/100 g.

As examples of resins, mention may be made of MQ resins, MDQ resins, TD resins and MDT resins.

In order to produce the compositions in accordance with the invention, it is necessary, in the case of the single-component compositions, to use equipment which makes it possible to intimately mix the various fundamental constituents in a moisture-free environment, with or without a supply of heat, optionally added to which constituents are the abovementioned adjuvants and additives. All these ingredients can be loaded into the equipment in any order of introduction. Thus, it is possible to first of all mix the organopolysiloxane oils C and the fillers F and then to add to the paste obtained the crosslinking agents D, the compounds E and the catalyst according to the invention. It is also possible to mix the oils C, the crosslinking agents D, the compounds E and the fillers F and to subsequently add the catalyst according to the invention. During these operations, the mixtures can be heated to a temperature within the range of 50-180° C. under atmospheric pressure or under a reduced pressure in order to promote the removal of volatile materials.

The single-component compositions in accordance with the invention, used as such, i.e. undiluted, or in the form of dispersions in diluents, are stable during storage in the absence of water and cure at low temperatures (after removal of solvents in the case of dispersions) in the presence of water so as to form elastomers.

After the deposition of the compositions as they are, onto solid substrates, in a humid atmosphere, it is observed that a process of curing to give elastomers occurs; it takes place from the outside to the inside of the mass deposited. A skin forms first at the surface, then the crosslinking occurs in depth. The complete formation of the skin, which results in a tack-free feel of the surface, requires a period of time of a few minutes; this period of time depends on the degree of relative humidity of the atmosphere surrounding the compositions and on the crosslinkability of said compositions.

Moreover, the in-depth curing of the deposited layers, which must be sufficient to allow the demolding and the handling of the elastomers formed, requires a longer period of time. Specifically, this period of time depends not only on the factors mentioned above for the formation of the tack-free feel, but also on the thickness of the deposited layers, said thickness generally lying between 0.5 mm and several centimeters. The single-component compositions can be used for multiple applications such as jointing in the construction industry, assembling the most diverse materials (metals, plastics, natural and synthetic rubbers, wood, board, earthenware, brick, ceramic, glass, stone, concrete, masonry units), insulating electrical conductors, the potting of electronic circuits, or the preparation of molds used for manufacturing articles made of synthetic resins or foams.

The production of the two-component compositions in accordance with the invention is also carried out by mixing the various constituents in suitable equipment. In order to obtain homogeneous compositions, it is preferable to first of all mix the polymers A with the fillers C; the whole mixture can be heated for at least 30 minutes at a temperature above 80° C., so as to complete the wetting of the fillers by the oils. The other constituents, i.e. the crosslinking agents, the catalyst and, optionally, various additives and adjuvants and even water, can be added to the mixture obtained, preferably brought to a temperature below 80° C., for example of around room temperature.

The compositions in accordance with the invention can be used for multiple applications, such as jointing and/or bonding in the construction industry or the transportation industry (examples: automobile, aerospace, railroad, maritime and aeronautical industries), assembling the most diverse materials (metals, plastics, natural and synthetic rubbers, wood, boards, polycarbonate, earthenware, brick, ceramic, glass, stone, concrete and masonry units), insulating electrical conductors, the potting of electronic circuits, and the preparation of molds used for manufacturing articles made of synthetic resins or foams.

Thus, another subject of the invention consists of a two-component system which is a precursor of the organopolysiloxane composition according to the invention and as defined above and which can be vulcanized to give a silicone elastomer via polycondensation reactions and which is characterized in that it is in two separate parts P1 and P2 intended to be mixed so as to form said composition, and in that one of these parts comprises the catalyst according to the invention and as defined above as catalyst of the reaction for polycondensation of organopolysiloxanes and the crosslinking agent D, whereas the other part is free of the abovementioned entities and comprises:

for 100 parts by weight of the polyorganosiloxane oil(s) C capable of crosslinking by polycondensation to give an elastomer, and from 0.001 to 10 part(s) by weight of water.

Another subject of the invention also consists of a single-component polyorganosiloxane composition which is stable during storage in the absence of moisture and which crosslinks, in the presence of water, to give an elastomer, characterized in that it comprises:

at least one crosslinkable linear polyorganopolysiloxane that has functionalized ends of alkoxy, oxime, acyl and/or enoxy type, preferably alkoxy type, a filler, and the catalyst of the polycondensation reaction according to the invention and as defined above.

Single-component bases are described in detail, for example, in patents EP 141 685, EP 147 323, EP 102 268, EP 21 859, FR 2 121 289 and FR 2 121 631, cited by way of reference.

It is possible to add, to these single-component bases, adhesion promoters E chosen, for example, from organosilicon compounds simultaneously bearing, on the one hand, organic groups substituted with radicals chosen from the group of amino, ureido, isocyanate, epoxy, alkenyl, isocyanurate, hydantoyl, guanidine and mercaptoester radicals and, on the other hand, hydrolyzable groups, in general alkoxy groups bonded to the silicon atoms. Examples of such adhesion agents are described in United States patents U.S. Pat. Nos. 3,517,001, 4,115,356, 4,180,642, 4,273,698 and 4,356, 116 and in European patents EP 31 996 and EP 74 001.

Two-component bases are described in detail, for example, in patents EP 118 325, EP 117 772, EP 10 478, EP 50 358, EP 184 966, U.S. Pat. Nos. 3,801,572 and 3,888,815, cited by way of reference.

Other advantages and characteristics of the present invention will become apparent on reading the following examples given by way of illustration and that are in no way limiting.

EXAMPLES

I) Preparation of the Catalysts According to the Invention (A-2): 1-butyl-2,3-dicyclohexyl-1,3-dimethylguanidine 18.38 g of cyclohexyl isocyanate (0.147 mol) are added dropwise to a solution of 19.12 g of N-methyl-N-cyclohexylamine (0.169 mol) in 160 ml of hexane and then the cloudy mixture is refluxed for 2 h and then evaporated to dryness, to give 35 g of crude N,N'-dicyclohexyl-N-methylurea. 12 g of POCl$_3$ (78 mmol) is added, over 1 h, to a suspension of 17 g of said N,N'-dicyclohexyl-N-methylurea (71.33 mmol) in 65 ml of toluene, and then, after a few hours at 20° C., 15.5 g of N-butyl-N-methylamine (0.178 mmol) are added over 2 h, and then, after a further 2 h at 20° C., 50 ml of water are added. 49 g of 35% sodium hydroxide are then added while cooling, and the two-phase medium is then extracted with diisopropyl ether. After drying and evaporation to dryness, the oil obtained, 26.5 g, is distilled at 180° C. under 1 mbar, to give 21.25 g of the expected guanidine (yield 97%).

(A-3): N-butyl-N'-cyclohexyl-N-ethylpiperidine-1-carboxamidine 23.8 g of cyclohexyl isocyanate (0.190 mol) are added dropwise to a solution of 18.62 g of piperidine (0.219 mol) in 360 ml of hexane, and then the cloudy mixture is refluxed for 2 h and then cooled and filtered, to give 39.3 g of pure N-cyclohexylpiperidine-1-carboxamide (yield 98.3%). 12 g of POCl$_3$ (78 mmol) are added, over 1 h, to a suspension of 15.05 g of said N-cyclohexylpiperidine-1-carboxamide (71.6 mmol) in 65 ml of dry toluene, and then, after a few hours at 20° C., 18.1 g of N-butyl-N-ethylamine (0.179 mmol) are added over 2 h, and then, after a further 2 h at 20° C., 50 ml of water are added. 49 g of 35% sodium hydroxide are then added while cooling, and the two-phase medium is then extracted with diisopropyl ether. After drying and evaporation to dryness, the oil obtained, 20 g, is distilled at 185° C. under 1 mbar, to give 17 g of the expected guanidine (yield 81%).

II) Single-Component System Examples

The paste used is prepared as follows: 16 g of a solution of lithium hydroxide at 2% by weight in methanol, followed, after 5 min, by 400 g of AE55 fumed silica, were added, with stirring, to a mixture of 3464 g of an α,ω-dihydroxylated oil with a viscosity of 20 000 centipoises containing 0.066% of OH, and of 120 g of vinyltrimethoxysilane. The mixture is devolatilized under vacuum and then stored in a moisture-free environment.

For each test, the catalyst tested is mixed with 50 g of this paste, and then the catalytic potential is evaluated in 3 ways:
- the skin-over time (SOT), time at the end of which surface crosslinking is observed, on a 2 mm film,
- the persistence of a tacky feel at 48 h,
- the hardness (Shore A hardness) of a 6 mm thick bead under controlled conditions (23° C. and 50% relative humidity) and over increasing times (2, 3, 7, 14 days, and 7 days at 23° C.+7 days at 100° C.).

Catalysts tested (A1) to (A3):

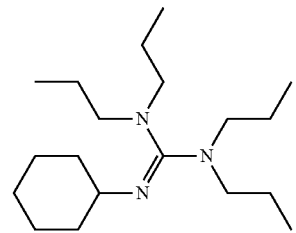

(A1)

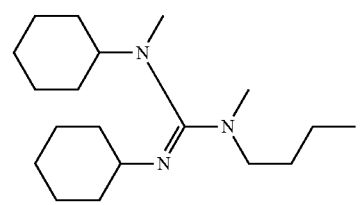

(A2)

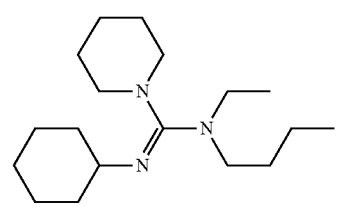

(A3)

By way of comparison, the following were also tested:
a tin-based catalyst: dibutyltin dilaurate (DBTDL), and 1,1,3,3-tetramethylguanidine (TMG).

TABLE I

| Catalysts tested | No. eq 1 eq = 0.70 mM | % by weight | SOT stick min | Tacky feel at 48 h | Shore A hardness over 6 mm | | | | | |
|---|---|---|---|---|---|---|---|---|---|---|
| | | | | | 2D >< | 3D >< | 4D >< | 7D >< | 14D >< | 7D RT + 7D 100° C. >< |
| (A-1) | 1.5 | 0.65 | 19 | yes | 7 0 | 12 7 | 18 13 | 26 22 | 31 27 | 28 27 |
| Invention | 3 | 1.3 | 12 | no | 15 4 | 23 15 | 27 21 | 29 24 | 31 26 | 30 28 |
| (A-2) | 1.5 | 0.65 | 14 | yes | 10 1 | 13 6 | | 29 22 | 31 26 | 31 28 |
| Invention | 3 | 1.3 | 8 | no | 21 11 | 26 18 | | 31 24 | 28 26 | 29 27 |
| (A-3) | 1.5 | 0.62 | 27 | yes | 8 5 | 13 5 | 18 12 | 27 21 | 32 26 | 30 25 |
| Invention | 3 | 1.2 | 18 | no | 15 3 | 23 15 | 26 21 | 30 26 | 32 27 | 32 27 |
| DBTDL | 1.00 | 0.93 | 17 | no | 32 21 | 33 30 | 35 31 | 35 31 | 31 30 | 29 25 |
| TMG | 4 | 0.64 | 2 | yes | 2 1 | 2 1 | / | 4 3 | 2 1 | 1 1 |

The 1,1,3,3-substituted guanidines (TMG) do not enable crosslinking of silicones in alkoxy systems.

1,1,3,3-Tetramethylguanidine (TMG) does not enable crosslinking of the silicone oil, even though it is at molar concentrations much higher than the guanidines according to the invention (A1) to (A3). The guanidines (A1) to (A3) according to the invention make it possible, by adapting the contents to very low values, not only to modulate the lengths of the skin-over times, but also to obtain elastomers which are very thermally stable and which have mechanical properties close to those obtained with the tin catalyst (DBTDL). Furthermore, these results show that the catalysts according to the invention (A1) to (A3), which are nontoxic, result in a more efficient catalysis than the tetramethylguanidine (TMG)-based catalysts. The catalysts according to the invention can therefore advantageously replace the existing catalysts.

III) Two-Component System Examples

The tests were carried out by mixing 25 g of α,ω-dihydroxylated oil having a viscosity of 14 000 centipoises, 1.06 g of prepolymerized ethyl silicate crosslinking agent and 0.7 mmol of catalyst. The results obtained with the guanidines (A-1), (A-2) and (A-3) are compared with those obtained with the dimethyltin bisneodecanoate catalyst, and also with tetramethylguanidine (non-demoldable): the pot-life, i.e. the time necessary for the formation of a gel which is no longer readily flowable, and the Shore A hardnesses at the top and bottom of a 6 mm thick demolded slug were measured.

TABLE II

| Catalyst | Pot-life | Shore hardness A 24 h > < | | Shore hardness A 4 days > < | | Shore hardness A 14 days > < | | Shore hardness A n days > < | |
|---|---|---|---|---|---|---|---|---|---|
| Guanidine (A-1) Invention | 12 min | 24 | 18 | 23 | 23 | 21 | 20 | 21 | 19 (28 d) |
| Guanidine (A-2) Invention | 7 min | 24 | 18 | 23 | 24 | 20 | 18 | 19 | 18 (28 d) |
| Guanidine (A-3) Invention | 6 min | 25 | 18 | 23 | 22 | 21 | 21 | 20 | 18 (28 d) |
| dimethyltin bisneodecanoate | 6 min | 22.5 | 22.5 | / | | / | | 23 | 23 (20 d) |
| TMG | 7 min | Non-demoldable | | | | | | | |

The catalysts (A-1) to (A-3) according to the invention are particularly efficient, with a pot-life and hardness kinetics which are entirely comparable to the tin catalyst reference (DBTDL).

The invention claimed is:

1. An organopolysiloxane composition comprising:
(a) a silicone base B comprising at least one polyorganosiloxane oil or gum C crosslinkable via a polycondensation reaction to form a silicone elastomer and
(b) a catalytically effective amount of at least one polycondensation catalyst A having formula (I):

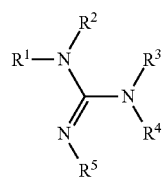
(I)

in which:
the $R^1$, $R^2$, $R^3$, $R^4$ or $R^5$ radicals, which may be identical or different, represent, independently of one another, a linear or branched monovalent alkyl group, a cycloalkyl group, or a (cycloalkyl)alkyl group, the $R^1$, $R^2$, $R^3$ or $R^4$ radicals may be linked in pairs so as to form a 3-, 4-, 5-, 6- or 7-membered aliphatic ring optionally substituted with one or more substituents, and with the proviso that: (1) the $R^1$, $R^2$, $R^3$, $R^4$ and $R^5$ radicals do not comprise a silicon atom, (2) the catalyst does not comprise a compound of formula (A1) to (A3),

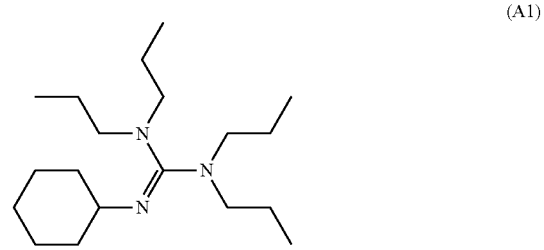
(A1)

-continued

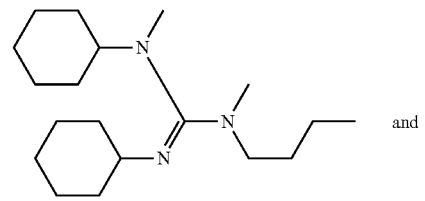
(A2) and

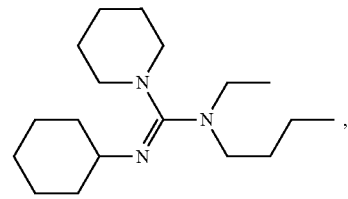
(A3)

and (3) the composition does not contain any metal catalyst.

2. The organopolysiloxane composition of claim 1, wherein the polycondensation catalyst a having formula (I) in which:

the R¹ radicals, which may be identical or different, and the R³ radical are chosen, independently of one another, from the group consisting of: an isopropyl radical, a cyclohexyl radical and a linear or branched, monovalent $C_1$-$C_{12}$ alkyl radical, the R² radical represents a linear or branched monovalent alkyl group, a cycloalkyl group, or an alkyl group substituted with a ring, and the R¹, R², R³ or R⁴ radicals can be linked in pairs so as to form a 3-, 4-, 5-, 6- or 7-membered aliphatic ring optionally substituted with one or more substituents.

3. The composition of claim 2, wherein the silicone base B comprises:
   at least one polyorganosiloxane oil C crosslinkable by polycondensation to form an elastomer;
   optionally, at least one crosslinking agent D;
   optionally, at least one adhesion promoter E; and
   optionally, at least one siliceous, organic and/or nonsiliceous mineral filler F.

4. The organopolysiloxane composition of claim 1, wherein the silicone base B comprises:
   at least one polyorganosiloxane oil C crosslinkable by polycondensation to form an elastomer;
   optionally, at least one crosslinking agent D;
   optionally, at least one adhesion promoter E; and
   optionally, at least one siliceous, organic and/or nonsiliceous mineral filler F.

5. The organopolysiloxane composition of claim 4, in which:
   (a) the silicone base B comprises:
      for 100 parts by weight of at least one polyorganosiloxane oil C capable of crosslinking by polycondensation, which is an α,ω-dihydroxydiorgano-polysiloxane reactive polymer of which the organic radicals are hydrocarbon-based radicals, selected from the group consisting of: alkyl radicals containing from 1 to 20 carbon atoms; cycloalkyl radicals containing from 3 to 8 carbon atoms; alkenyl radicals containing from 2 to 8 carbon atoms and cycloalkenyl radicals containing from 5 to 8 carbon atoms,
      from 0.1 to 60 parts by weight of at least one crosslinking agent D selected from the group consisting of: polyalkoxysilanes, products originating from the partial hydrolysis of a polyalkoxysilane, and polyalkoxysiloxanes,
      from 0 to 60 parts by weight of an adhesion promoter E,
      from 0 to 250 parts by weight of at least one siliceous, organic and/or nonsiliceous mineral filler F,
      from 0.001 to 10 parts by weight of water,
      from 0 to 100 parts by weight of at least one non-reactive, linear polyorganosiloxane polymer G consisting of a linear homopolymer or copolymer of which, per molecule, the monovalent organic substituents, which may be identical to or different than one another, and which are bonded to the silicon atoms, are selected from the group consisting of alkyl, cycloalkyl, alkenyl, aryl, alkylarylene and arylalkylene radicals,
      from 0 to 20 parts by weight of a coloring base or of a coloring agent H,
      from 0 to 70 parts by weight of polyorganosiloxane resins I, and
      from 0 to 20 parts of auxiliary additives J selected from the group consisting of plasticizers, crosslinking retardants, mineral oils, antimicrobial agents and heat stabilizers, and
   (b) from 0.1 to 50 parts by weight of at least one polycondensation catalyst A as defined according to claim 1.

6. The organopolysiloxane composition of claim 5, in which that at least one siliceous, organic and/or nonsiliceous mineral filler F is present from 5 to 200 parts by weight.

7. The organopolysiloxane composition of claim 5, wherein auxiliary additive J is selected from the group consisting of titanium oxides, iron oxides and cerium oxides.

8. An elastomer obtained by crosslinking and curing the composition as defined in claim 1.

9. A single-component polyorganosiloxane composition comprising:
   at least one crosslinkable linear polyorganosiloxane oil C having functionalized ends of alkoxy, oxime, acyl and/or enoxy type,
   at least one crosslinking agent D,
   at least one filler F, and
   at least one polycondensation catalyst A having formula (I):

in which:
   the R¹, R², R³, R⁴ and R⁵ radicals, which may be identical or different, represent independently of one another, a linear or branched monovalent alkyl group, a cycloalkyl group, a (cycloalkyl)alkyl group,
   the R¹, R², R³ or R⁴ radicals can be linked in pairs so as to form a 3-, 4-, 5-, 6-or 7-membered aliphatic ring optionally substituted with one or more substituents and
   with the proviso that: (1) the R¹, R², R³, R⁴ and R⁵ radicals do notcomprise a silicon atom, and (2) the catalyst does not comprise a compound of formula (A1) to A3)

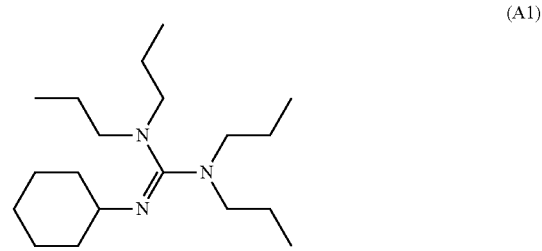

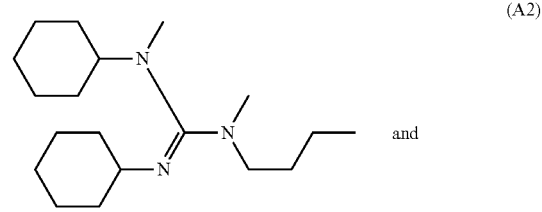

and

-continued

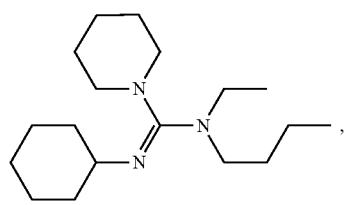
(A3)

wherein said composition is stable during storage in the absence of moisture and is crosslinkable in the presence of water to form an elastomer.

10. The composition of claim 9, wherein the crosslinking agent D is selected from the group consisting of vinyltriethoxysilane, methyltriethoxysilane, propyltriethoxysilane, tetraethoxysilane, 1,2-bis(triethoxysilyl)ethane, $C_2H_5Si(OC_2H_5)_3$, and $Si(OC_2H_5)_4$.

11. The single-component polyorganosiloxane composition as claimed of claim 9, wherein the crosslinkable linear polyorganosiloxane oil C which has functionalized ends of alkoxy type is prepared in situ by the reaction, in the presence of a catalytically effective amount of lithium hydroxide, of a linear diorganopolysiloxane comprising a hydroxyl group bonded to a silicon atom at each chain end, with at least one polyalkoxysilane of formula (II):

$$(R^4)_c(R^5)_aSi(OR^6)_{4-(a+c)}$$ (II)

in which:
a is equal to 0, 1 or 2,
c is equal to 0, 1 or 2,
the sum a+c is equal to 0, 1 or 2,
$R^4$ represents an aliphatic, cyclanic or aromatic, substituted or unsubstituted, and saturated or unsaturated $C_1$ to $C_{13}$ hydrocarbon-based monovalent radical, it being possible for $R^4$ to be identical to $R^5$,
$R^5$ represents an aliphatic, cyclanic or aromatic, substituted or unsubstituted, and saturated or unsaturated $C_1$ to $C_{13}$ hydrocarbon-based monovalent radical which can comprise an epoxy, primary, secondary or tertiary amine, or mercapto function, and
$R^6$ represents an aliphatic organic radical containing from 1 to 8 carbon atoms selected from the group consisting of alkyl radicals, alkyl ether radicals, alkyl ester radicals, alkyl ketone radicals, alkylcyano radicals and aralkyl radicals containing from 7 to 13 carbon atoms, where the alkoxy groups of the silane of formula (II) can each have a different meaning for $R^6$ or the same meaning.

12. The single-component polyorganosiloxane composition of claim 9, wherein the crosslinking agent D or the polyalkoxysilane of formula (II) are selected from the group consisting of vinyltriethoxysilane, methyltriethoxysilane, propyltriethoxysilane, tetraethoxysilane, 1,2-bis(triethoxysilyl)ethane, $C_2H_5Si(OC_2H_5)_3$, and $Si(OC_2H_5)_4$.

13. An elastomer obtained by crosslinking and curing the single-component polyorganosiloxane composition as defined in claim 9.

14. A method of catalyzing a organopolysiloxane polycondensation reaction comprising mixing a silicone base comprising at least one polyorganosiloxane oil or gum C with a catalytically effective amount of a polycondensation catalyst A having formula (I):

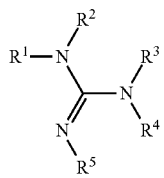
(I)

in which:
the $R^1$, $R^2$, $R^3$, $R^4$ or $R^5$ radicals, which may be identical or different, represent, independently of one another, a linear or branched monovalent alkyl group, a cycloalkyl group, a (cycloalkyl)alkyl group,
the $R^1$, $R^2$, $R^3$ or $R^4$ radicals can be linked in pairs so as to form a 3-, 4-, 5-, 6- or 7-membered aliphatic ring optionally substituted with one or more substituents, and
with the proviso that: (1) the $R^1$, $R^2$, $R^3$, $R^4$ and $R^5$ radicals do not comprise a silicon atom, and (2) the catalyst does not comprise a compound of formula (A1) to (A3),

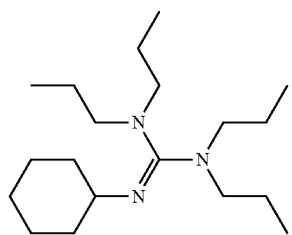
(A1)

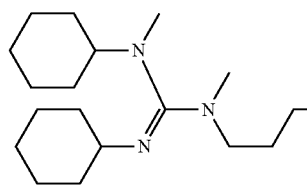
(A2)

and

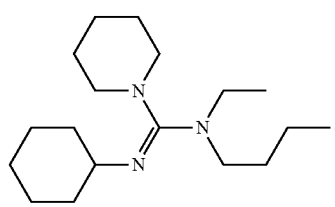
(A3)

* * * * *

UNITED STATES PATENT AND TRADEMARK OFFICE
CERTIFICATE OF CORRECTION

Page 1 of 1

PATENT NO. : 8,871,889 B2
APPLICATION NO. : 13/900046
DATED : October 28, 2014
INVENTOR(S) : Christian Maliverney It is certified that error appears in the above-identified patent and that said Letters Patent is hereby corrected as shown below:

- On the Title page, Item (60) should read:

"(60)  Continuation of application No. 13/131,146, filed on Jul. 29, 2011, filed as application No. PCT/EP2009/065628 on Nov. 23, 2009."

- In addition, on the Title page please add Item (30) which should read:

"(30)    Foreign Application Priority Data
Nov. 25, 2008        (FR) ..........................08 06610"

Signed and Sealed this
Seventh Day of July, 2015

Michelle K. Lee
*Director of the United States Patent and Trademark Office*